United States Patent [19]

Walker, Jr.

[11] Patent Number: 4,812,425

[45] Date of Patent: Mar. 14, 1989

[54] PURIFYING REFRACTORY METAL BORIDES

[75] Inventor: Joseph K. Walker, Jr., Beachwood, Ohio

[73] Assignee: ELTECH Systems Corporation, Boca Raton, Fla.

[21] Appl. No.: 148,462

[22] Filed: Jan. 26, 1988

Related U.S. Application Data

[63] Continuation-in-part of Ser. No. 871,445, Jun. 6, 1986, abandoned.

[51] Int. Cl.$^4$ .................... C01B 35/04; C04B 35/02
[52] U.S. Cl. .................................... 501/96; 423/297
[58] Field of Search ................ 501/96; 423/297, 289

[56] References Cited

U.S. PATENT DOCUMENTS

| | | | |
|---|---|---|---|
| 2,973,247 | 2/1961 | Espenschied | 23/204 |
| 3,013,862 | 12/1961 | May | 423/297 |
| 3,316,062 | 4/1967 | Criscione | 423/297 |
| 3,379,647 | 4/1968 | Smudski | 252/301.1 |
| 4,452,767 | 6/1984 | Brynestad et al. | 423/297 |
| 4,595,545 | 6/1986 | Sane | 264/65 |

FOREIGN PATENT DOCUMENTS 0121476 10/1984 European Pat. Off. .
1004585 9/1965 United Kingdom .

Primary Examiner—William R. Dixon, Jr.
Assistant Examiner—James M. Hunter, Jr.
Attorney, Agent, or Firm—John J. Freer

[57] ABSTRACT

The invention relates to the production of desirably purified refractory metal borides. The method can be used to purify even commercially available material. Careful attention is directed to the oxygen impurity level of the refractory metal boride and such will usually be maximized at a very low level. Critical attention is directed to the oxygen to carbon molar ratio. Heating of impure materials, typically presented in consolidated form and having constituent adjustments in accordance with invention principles, can lead to the preparation of products of highly desirable density, on the one hand, and prepare products of extremely low contamination levels, on the other hand.

18 Claims, No Drawings

PURIFYING REFRACTORY METAL BORIDES

CROSS-REFERENCE TO RELATED APPLICATION

This application is a continuation-in-part of U.S. patent application Ser. No. 871,445 filed June 6, 1986 and now abandoned.

BACKGROUND OF THE INVENTION

Refractory metal borides have been proposed for uses based upon their strength and hardness and as components in electrolytic aluminum production cells, particularly those components which in use may normally be contacted with molten aluminum. Borides and in particular titanium diboride are often preferred on account of their especially excellent strength, hardness, wettability by molten aluminum and good electrical conductivity. However, problems have been encountered in producing these materials with sufficient density and purity to exhibit desirable resistance to attack by molten aluminum cryolite, or mixtures thereof.

Processes for preparing the refractory metal boride have considered various details in processing, e.g., attention to stoichiometric requirements, to prepare a most purified product. Generally, such product will be prepared by carbothermic reduction and reaction sintering to a final product. This need not be done in one stage. For example, in U.S. Pat. No. 4,495,545, a two-stage carbothermic reduction process is disclosed for preparing refractory metal borides. As a first step, a glassy organo-metallic product is produced. Adjustments can be made to this product prior to a second reaction step to prepare a final material having reduced contamination by impurities.

Other paths seeking a solution to the problem of product contamination and focusing on reaction components, include typically preparing an intimate mixture of materials for heating, or tolerating excesses of some ingredients substantially above stoichiometric. These approaches have been disclosed such as in U.S. Pat. Nos. 2,973,247 and 3,379,647 and British Pat. No. 1,004,585.

Yet another approach to purified product involves removing contaminants after product preparation. This has been taught to include an addition of ingredients in combination, more particularly a combination of refractory metal, oxide or oxides, plus carbon. In U.S. Pat. No. 3,013,862 it is taught to use titanium metal to release oxygen in crude titanium diboride product. With the metal plus oxides, and carbon present as a contaminant, or added, it is taught that both oxygen and carbon impurities in the crude product can be reduced.

Removal of cubic phase impurities in powdered $TiB_2$ by blending the particulate with a boron-supplying compound, e.g., BN, and heating the mixture in a crucible has been disclosed. In general, the compound added should be capable of supplying boron to react with the titanium of the cubic phase to form titanium diboride. In U.S. Pat. No. 3,316,062 it is taught to remove cubic phase impurities of borides, oxides, nitrides and carbides, such as titanium monocarbide, by reaction with boron. More recently in European Patent Application Publication No. 121,476 it has been disclosed to remove contaminating oxides, nitrides and carbides of titanium from $TiB_2$ articles by either annealing in a BN pack or by adding BN or elemental boron to $TiB_2$ powder and sintering the article.

The matter of the removal of oxide contamination of titanium diboride is addressed in U.S. Pat. No. 4,452,767. As discussed therein, it is noted that the carbothermic reduction method for producing titanium diboride produces product that is always contaminated with oxides. The chemical vapor deposition process for producing titanium diboride can produce a large particulate, which when mechanically ground into a powder can consequently become contaminated such as with alumina or silicon metal oxides from the grinding apparatus. It is thereby proposed to remove oxide contamination by chemically treating the titanium diboride powder with a gaseous boron halide.

However, much of the commercially available boride still suffers from carbon contamination as well as oxygen contamination. The carbon contamination alone, or in combination with the oxygen contamination, can severely detract from the utility of the commercial product. It would therefore be highly desirable to readily and efficiently reduce the carbon contamination of commercial material, which reduction method would most desirably likewise lead to reduced oxygen contamination.

SUMMARY OF THE INVENTION

A method has now been found for efficiently preparing a refractory metal boride product of high purity. The method is quite useful even with a starting material that is a contaminated, commercially available substance. Resulting end products of high purity can now be economically achieved, which products may also exhibit most desirable density when reaction sintered. The method is especially useful for producing boride having substantially reduced levels of carbon contamination and can result in reduced oxygen contamination.

Briefly, the invention is directed to the method of producing a consolidated body containing purified refractory metal boride from an impure particulate refractory metal boride containing oxygen and boron carbide impurities and having total oxygen content of about 2% or less, by weight of the boride, but with the proviso that such oxygen content can exceed the 2 weight percent when the total of carbon impurity content is greater than about 0.75 percent by weight of the boride; which method comprises (a) admixing boron oxide to impure particulate refractory metal boride containing boron carbide impurity to bring the O:C molar ratio to at least 2:1 while maintaining the total oxygen content in accordance with the conditions as stated hereinbefore; (b) heating the admixture at a temperature substantially below the sintering temperature of the refractory metal boride and substantially below a temperature favoring oxide formation of the refractory metal, but sufficiently elevated to oxidize said boron carbide impurity, at a reduced pressure and for a time sufficient to substantially reduce the boron carbide impurity; and (c) heating the admixture to the sintering temperature of the refractory metal boride at a reduced pressure and for a time sufficient to further reduce the boron carbide and oxygen impurity content of the material from step (b) and to provide a consolidated body containing the purified refractory metal boride.

In one important aspect, the invention is directed to a purified titanium diboride containing less than about 1500 ppm oxygen and less than about 500 ppm carbon, and prepared by the method of the present invention.

The invention can further provide for the production of highly desirable impact resistant articles as well as electrically conductive components such as for an electrolytic aluminum production cell.

DESCRIPTION OF THE PREFERRED EMBODIMENTS

The finished products that can be produced are refractory metal borides, their alloys, mixtures, composites and cermets thereof. These are most typically the borides of the Group IVb metals titanium, zirconium and hafnium, Group Vb metals vanadium, niobium and tantalum, and Group VIb metals chromium, molybdenum and tungsten. But other borides are contemplated, e.g., the borides of the lanthanide series of metals such as $LaB_6$. Mixtures and composites can include physical mixtures, e.g., physical mixtures of titanium and zirconium diboride, and ceramic composites such as $TiB_2$/AlN. The cermets can include substances such as $TiB_2$/Al. The cermets can generally be formed during a final sintering step.

Commercial, particulate borides, as exemplified by the diborides of titanium and zirconium, are often prepared commercially by the reaction of the metal oxide with boron carbide and carbon, so that the product can be expected to contain such substances as impurities. By most any preparation method, the material can be expected to have deleterious amounts of carbon and oxygen impurities. The material will be in finely divided condition, with predecessor material sometimes existing as chunky bodies, e.g., agglomerated bodies, that are comminuted, and this operation may contribute to the impurity content. The particle size of such commercial material, as from comminution, can be expected to average from as low as 5 to 10 microns to as much as 20 microns or more. Large particulates may be on the order of 50 microns, while fines can be 0.1 micron or so. Typical impurity levels, such as oxygen impurity from suboxides and borates, which might be included as $TiO_2$ and $B_2O_3$ in a commercial titanium diboride, may be as low as 0.2 to 0.6 weight percent or less, varying up to 4 to 5 weight percent or even more, basis total weight of the commercial product. It is not unusual for the carbon impurity in titanium diboride to be almost all, if not all, present as boron carbide, as well as have the weight percent of the total of the carbon impurities in such a representative material approximate the same weight percent as the oxygen contamination.

It might be desirable to initially process the particulate boride so that its oxygen content is established at a reduced level. Advantageously such amount is of less than about two weight percent, and preferably at less than about one weight percent, although greater amounts can be tolerable, as will be discussed hereinbelow. Commercial material having an amount of oxygen contamination of below about two weight percent, and occasionally of less than one weight percent, may be available thereby obviating this initial processing. The commercial titanium diboride used in the example presented hereinbelow has oxygen content of 1.44 weight percent. Since such diboride has oxygen content well below two weight percent, no initial adjustment to oxygen content has been made in the processing in the example.

However, commercial materials containing four weight percent or more of oxygen can be available. See for example U.S. Pat. No. 4,452,767. Adjustment for such borides is most desirable. When adjustment is used, a suitably useful method for adjusting the oxygen content level, as can be employed with titanium diboride commercial particulates, is reaction with gaseous boron halide. Such has been disclosed in U.S. Pat. No. 4,452,767. As discussed therein, commercially available titanium diboride having oxygen levels of several weight percent can be successfully treated with boron trichloride at elevated temperature, e.g., at temperatures in the range of 500°–800° C., to prepare a more purified product of greatly reduced oxygen contamination. It is preferable that such purification procedure not contribute any carbon impurity in the product.

It is critical that the molar ratio of oxygen to carbon (O:C) in the particulate boride be at least about 2:1 and generally will be greater. Thus the oxygen to carbon molar ratio will generally be at least about 3:1 or more, such as 4:1, and advantageously will be within the range of from about 4:1 to about 5:1, although much higher ratios, e.g., on the order of 10:1 or more, can be useful, as where carbon content is initially quite low. Although it is most desirable to have an oxygen level of less than about two weight percent, if the total of the carbon content is greater than 0.75 weight percent, an oxygen level above such desirable level will have to be tolerated, e.g., to as much as six weight percent or more, so as to observe even the minimum about 2:1 critical ratio, and especially to achieve a more usual 3:1 molar ratio.

A molar ratio of oxygen to carbon of about 2:1 will insure enhanced removal of contaminants during heating for contaminant vaporization. To comply with the necessary molar ratio, and preferably to achieve a molar ratio of at least 3:1 to 4:1, a source of boron oxide can be used for adjustment, which source is most always referred to herein for convenience simply as "boron oxide". Such adjustment can be accomplished by the simple mixing of a source of boron oxide with the refractory metal boride particulate. Suitable useful sources of boron oxide include boron oxide as well as precursors of boron oxide and these include boric acid, boron anhydride and trimethyl borate, it being understood that $B_2O_3$ is most always contemplated for considerations such as calculating molar ratio. For ease in blending, it is most desirable to use a solid, finely divided boron oxide and to blend such material with the particulate refractory metal boride in any operation suitable for blending solid particulates. It is however contemplated that a source of boron oxide in liquid condition, e.g., such as in an aqueous or organic solvent, can be used. The solvent can be volatilized during blending operation, or during pressing or by initial, low temperature heating.

The resulting mixture is then generally pressed which may be by roller pressing or dry pressing in a mold or isostatic pressing, or cold pressing and heating or hot pressing. This produces a body of the mixture for further reaction by heating. Other operations, e.g., machining or drilling of the resultant shaped product, may be employed before heating. A typical pressure for the pressing can be within the range from about 5 KPSI to about 40 KPSI. After pressing, the material is ready for heating.

The heating will most always be conducted at a reduced pressure, such as in a vacuum furnace. Usually a partial pressure within the range of from about 1 millitorr to about 5000 millitorrs will be used and more particularly, for efficient evacuation of vaporized contaminants plus economy of operation, the heating will be conducted at a reduced pressure within the range from on the order of about 50 millitorrs to about 1000 millitorrs. Usually an inert gas atmosphere, such as of argon, will be used with the reduced pressure heating. If the pressed article for heating is of sufficient size, it will typically be placed in a carbon or graphite crucible. In the heating, the material is often first heated for a brief time at a reduced temperature, for example from about 200°–400° C., to evacuate trapped gases and vaporize any liquids. The heating is continued but will always be maintained at substantially less than the normal or conventional sintering temperature for the particular refractory metal boride or boride combination, as well as essentially below a temperature favoring oxide formation from the refractory metal. A temperature of 700° C. below the normal or conventional sintering temperature will be most useful, although temperatures only 500° to 600° C. below, or as much as 800°–1100° C. below, are contemplated. In the specific case for the decontamination of titanium diboride, any brief initial heating at a low temperature can be followed by a gradual temperature increase, for example up to about 1400° C. in about 5 to 10 hours of heating. The temperature can then be maintained at about the 1200°–1500° C. range for a short while, such as about 2 to 6 hours. For comparison, a usual sintering temperature range for titanium diboride can be expected to be on the order of about 1800°–2200° C., with the normal or conventional sintering temperature of 2100° C. being used for purposes of the foregoing discussion. Moreover, a temperature in excess of about 1500° C. will begin to favor oxide formation from the titanium, i.e., the formation of $Ti_2O_3$. Hence, a temperature of greater than about 1600° C., is to be avoided. While furthermore the above-mentioned 1400° C. temperature and 1200°–1500° C. range will therefore be most preferable. Following this elevated temperature heating, the product is permitted to cool.

Usually the resulting material can be expected to crumble easily. It therefore generally need not be comminuted, although such operation might be in order. It is to be understood that other components may be blended with the refractory metal boride particulate at this time. For example, the addition of a particulate metal such as aluminum could be blended with the metal boride for the subsequent preparation of a cermet in a sintering operation. The addition of such components can be made by any method known to those skilled in the art suitable for preparing well blended mixtures of ingredients. This may include the addition of substances dissolved or suspended in solvents and the solvents can be made fugitive during the blending operation. It is furthermore contemplated that binders might be useful and ingredient additions can be accomplished by being included in such binder materials. For use as binders those materials known in the art are suitable such as the usual waxes and organic liquids, e.g., camphor or paraffin wax can be advantageous to insure structural integrity of the shaped article during subsequent sintering. The binder itself may be dissolved in a solvent to assist in preparing a uniform dispersion of ingredients. The solvent can be volatilized during mixing operation or during pressing where materials are compacted by pressing into desirable shapes. Such pressing and shaping operations have been more particularly discussed hereinbefore, but suitable forming techniques can include slip casting, extrusion and hot pressing techniques. A typical pressure for a pressing operation can be within the range of from about 20 KPSI to about 40 KPSI.

Where sintering will be conducted with the purified refractory metal boride, it will generally proceed under a reduced pressure, e.g., at a reduced pressure within the range from about 1 millitorr to about 5,000 millitorrs, and at elevated sintering temperature. A sintering aid can also be useful. To achieve sintering, heating is often initiated gradually, especially where binder has been used, to accommodate binder burnoff. When this has been accomplished, and as heating is continued under reduced pressure, a quite rapid temperature increase can be permitted. Thus in the case of the preparation of titanium diboride, a shaped article may be heated at a low temperature of 100°–300° C. for a short while to remove binder and then heated from a temperature of about 500° C. up to 2000° C. or more in a time from as short as about 0.5 hour to as long as about 4 to 5 hours or more, e.g., as much as 10 hours. Usually a vacuum furnace is employed so as to obtain a low pressure, such as has been discussed hereinbefore, during the sintering operation. Also, as mentioned before, a crucible can be useful. Continuing with the specific embodiment of titanium diboride, this sintering temperature can be maintained generally within the range of from about 2000° C. to less than about 2300° C. for a time of from about 1 hour to about 4 hours.

At the end of the sintering operation, the resulting consolidated and sintered product is permitted to cool. Upon testing, and using titanium diboride sintered product as an exemplification, sintered materials having a specific gravity in excess of 65 percent are readily achievable. Moreover, sintered titanium diboride product can have an oxygen impurity level of not in excess of about 1500 parts per million (ppm) oxygen or less such as 1000 parts per million oxygen or even less. Furthermore, the carbon level can be expected to be below 1000 ppm, e.g., on the order of 800 parts per million, and may be as low as 500 parts per million or even less. Thus carbon contaminant reduction for commercial material, to purified sintered product, can be on the order of ten fold or more.

The foregoing discussion on heating has been presented as a two-step procedure where sintering is the second step. It is, however, to be understood that a one-step heating procedure may be used where sintering is to be accomplished. For example, with a representative titanium diboride an initial reduced pressure heating step at about 1400° C. for about four hours can be followed by elevating the temperature to about 2000° C. and holding at that temperature for a time of about two hours. It is also to be understood that if a one-step procedure is used, substances such as metallic particulates or ceramic ingredients such as finely divided aluminum nitride, for preparing final sintered cermets and composites, will be blended with the refractory metal boride material to be purified before the initiation of the one-step heating.

The following example shows a way in which the invention has been practiced but should not be construed as limiting the invention.

EXAMPLE 1

A commercially available titanium diboride was analyzed by scanning electron microscopy and found to have average particle size on the order of 7 microns. This commercial product was found to contain 1.44 weight percent oxygen, and 1.87 weight percent carbon. By X-ray diffraction, the carbon was found to be present as boron carbide.

For comparative (non-invention) purposes, a sample of this powder was then pressed into a pellet by first mixing with a 5 weight percent dispersion of Carbowax 200 (Union Carbide) dissolved in methylene chloride. The mixture was dried at 90° C. to drive off solvent and the resulting powder was then isostatically pressed at a pressure of about 30 KPSI. The pellet was placed in a carbon crucible. The pellet was packed in $B_4C$ powder as a sintering aid and the crucible then covered with a lid. The pellet was heated within the temperature range of 100°–300° C. to remove binder and then heated to about 2000° C. in about 2 hours. After reaching that temperature, this comparative pellet was maintained for 2 hours at temperature after which the furnace was allowed to cool. Pressure in the furnace during the heating was maintained at less than 1000 millitorrs and the atmosphere in the furnace during the heating was an argon gas atmosphere. Elemental analysis showed that the resulting sintered, comparative pellet had a carbon content of about 0.86 weight percent and an oxygen content of about 0.22 weight percent. Carbon was found by X-ray diffraction to be present as boron carbide and was also visible by optical and electron microscopy.

For invention purposes, a second sample of the commercial powder was mechanically blended with 8 weight percent of finely-divided $B_2O_3$, providing a molar ratio of oxygen to carbon in the blend of 3:1, and was then isostatically pressed at about 30 KPSI into a pellet. The pellet was placed in a clean carbon crucible and then heated in a vacuum furnace, from 25° C. to 1400° C. in 4 hours. The heating at 1400° C. was maintained for eight hours. The pressure during this heating was kept below 1000 millitorrs. Following a cool down period the pellet was found to crumble easily into a powder. Elemental analysis of a portion of this powder showed that the oxygen content was now 0.89 weight percent. The carbon content of 1.87 weight percent for the commercial product had been reduced to about 0.22 weight percent.

This powder was then further processed in accordance with invention principles, but in the manner described hereinbefore. That is, the portion of the powder for further testing was pelleted by first mixing with the Carbowax followed by isostatic pressing at 30 KPSI. The pressed pellet was placed in a carbon crucible, the pellet packed in the sintering aid, the crucible was covered with a lid and heated at a low temperature of 100°–300° C., to remove binder and then heated at the more elevated 2000° C. in about 2 hours. After reaching such elevated temperature, the sample was maintained at temperature for 2 hours after which the furnace was allowed to cool. Pressure was maintained at less than 1000 millitorrs. Elemental analysis showed that this sample prepared in accordance with invention principles contained 960 ppm oxygen (compared to 2200 ppm oxygen for the sintered, comparative material) and 800 ppm carbon (compared to 8600 ppm carbon for the above-discussed, sintered comparative sample). Furthermore, X-ray diffraction indicated no significantly measurable amount of boron carbide and boron carbide was not found by optical and electron microscopy.

I claim:

1. The method of producing a consolidated body containing purified titanium diboride, from an impure particulate refractory titanium diboride containing oxygen and boron carbide impurities and having total oxygen content of about 2% or less, by weight of said diboride, but with the proviso that said oxygen content can exceed said 2 weight percent when the total of all the carbon impurity for said diboride is greater than about 0.75 percent by weight of the diboride, which method comprises:
    (a) admixing impure particulate titanium diboride containing said boron carbide impurity with material consisting essentially of boron oxide to bring the O:C molar ratio to at least 2:1 while maintaining the total oxygen content in accordance with the conditions as stated hereinabove;
    (b) heating the admixture at a temperature substantially below the sintering temperature of the titanium diboride and substantially below a temperature favoring oxide formation of the titanium metal, but sufficiently elevated to oxidize said boron carbide impurity, at a reduced pressure and for a time sufficient to substantially reduce said boron carbide impurity; and
    (c) heating the admixture to the sintering temperature of the titanium diboride at a reduced pressure and for a time sufficient to further reduce the boron carbide, as well as to reduce the oxygen, impurity content of the step (b) and to provide a consolidated body containing the purified titanium diboride.

2. The method of claim 1, wherein said particulate titanium diboride has particles more finely sized than about 50 microns and has average particle size of less than about 20 microns.

3. The method of claim 1, wherein said total oxygen content for the impure titanium diboride particulate, after said admixing, is at an amount of less than about six weight percent, basis total weight of said diboride.

4. The method of claim 1 wherein said impure titanium diboride is initially processed to reduce total oxygen content and said initial processing includes heating.

5. The method of claim 4, wherein initial processing for said impure diboride particulate includes treatment of said diboride particulate with gaseous boron halide.

6. The method of claim 1, wherein the molar ratio of oxygen to carbon in said diboride is adjusted by admixing $B_2O_3$ therewith.

7. The method of claim 1, wherein the molar ratio of oxygen to carbon in said diboride is adjusted to an amount in excess of about 4:1.

8. The method of claim 1, wherein said admixture is established in a form for consolidation on heating.

9. The method of claim 1, wherein said admixture is subjected to sintering temperature for a time of at least about one hour.

10. The method of claim 1, wherein heated admixture from step (b) is blended with particulate metal or ceramic, the blend is consolidated and then subjected to sintering temperature.

11. The method of claim 1, wherein said heating proceeds at a reduced pressure within the range of from about 1 millitorr to about 5000 millitorrs in an inert atmosphere.

12. The method of claim 1, wherein said heating of step (b) is conducted at a temperature of at least about 500° C. below the sintering temperature for said diboride.

13. The method of claim 1 wherein said heated admixture from step (b) is prepared for reaction sintering followed by the heating of step (c).

14. The method of claim 13, wherein said heated admixture from step (b) is prepared for reaction sintering by compression to a pressed particulate compact.

15. A purified refractory titanium diboride produced by the method of claim 1 and containing less than about 1500 ppm oxygen and less than about 500 ppm carbon.

16. The purified refractory titanium diboride of claim 15, having a specific gravity of greater than about 65 percent and containing less than about 1000 ppm oxygen and less than about 500 ppm carbon.

17. A component of an electrolytic aluminum production cell which component is resistant to attack by molten aluminum, cryolite, or mixtures thereof, characterized in that said component contains titanium diboride produced by the method of claim 1.

18. An impact resistant, refractory-metal-containing article containing titanium diboride produced by the method of claim 1.

* * * * *